United States Patent [19]

McCleskey

[11] Patent Number: 6,061,983

[45] Date of Patent: May 16, 2000

[54] REMOVABLE UTILITY CONNECTION FLOOR BOX AND METHOD

[76] Inventor: Michael McCleskey, 26918 Deerweed Trail, Calabasas Hills, Calif. 91301

[21] Appl. No.: 09/087,695

[22] Filed: Jun. 1, 1998

[51] Int. Cl.[7] ........................................................ E04C 2/54
[52] U.S. Cl. .......................... 52/220.1; 52/263; 52/220.3; 52/220
[58] Field of Search .................................. 52/220, 220.3, 52/220.1, 263

[56] References Cited

U.S. PATENT DOCUMENTS

| | | |
|---|---|---|
| 3,318,476 | 5/1967 | Clark . |
| 3,343,704 | 9/1967 | Terry . |
| 3,912,106 | 10/1975 | Traupe ........................................ 220/3.4 |
| 5,257,487 | 11/1993 | Bantz et al. ................................ 52/220 |

*Primary Examiner*—Laura A. Callo
*Assistant Examiner*—Patrick J. Chavez
*Attorney, Agent, or Firm*—Robert J. Schaap

[57] ABSTRACT

An improved floor box of the type commonly installed into the concrete floor of a facility for providing temporary connections to utilities is disclosed which may be removed and replaced without requiring either the demolition and subsequent reconstruction of the floor in which the improved floor box is installed or the replacement or repair of the utility lines located in the floor and connected to the improved floor box. The improved floor box is secured within a rim member mounted into the concrete floor by bolts mounted from the inside of the improved floor box, and the outside of the improved floor box is wrapped with sheets of extruded polystyrene expanded foam material to prevent poured concrete from encasing the improved floor box itself, thereby permitting easy removal of the improved floor box from the concrete floor. The connections to the improved floor box to electrical and plumbing lines are made in a manner allowing them to be disconnected from the improved floor box from the inside thereof. A cover frame which fits into the rim member in a flush manner has removable covers mounted therein, with each cover having access doors located therein as well as pop-up handles to facilitate removal of the covers.

33 Claims, 7 Drawing Sheets

REMOVABLE UTILITY CONNECTION FLOOR BOX AND METHOD

BACKGROUND OF THE INVENTION

Field of the Invention

The present invention relates generally to a floor box of the type commonly installed into the floor of a facility for providing temporary connections to utilities, and more particularly to an improved utility connection floor box which may be removed and replaced without requiring either the demolition and subsequent reconstruction of the floor in which the floor box is installed or the replacement or repair of the utility lines located in the floor and connected to the floor box.

Floor boxes are typically installed in locations at which connections to utilities such as electrical power, telephone, data, audio/visual, compressed air, water, and a drain will be required on a temporary or occasional basis. For example, convention and exhibition facilities require that connections to utilities be available at a large number of different locations throughout the facility, and that exhibitors be able to connect to utility connections located in the floor boxes. Since conventions or exhibitions are typically held for a matter of several days or a week, it will be appreciated that such connections are only used for short periods of time between setup and teardown of the displays or exhibitions.

However, convention or exhibition facilities in most large cities will be in more or less continuous use throughout the year, with a large number of different shows or exhibitions coming and going in rapid succession. It will also be appreciated that the use of floor boxes offers ready connections to utilities in a manner which is unobtrusive, and which does not require a great deal of time to set up or run electrical and plumbing lines. However, in order to afford the maximum degree of flexibility in configuring exhibit areas, it will be appreciated that a relatively large number of such floor boxes will be installed throughout the convention or exhibition facility.

Such floor boxes are installed at the time the facility is constructed, and are recessed into the concrete floors, which may be either slab on grade or structural floors. The floor boxes are typically made of either electro-galvanized steel, painted carbon steel, or stainless steel. The floor boxes are open on the top side thereof, and have a frame typically made of angle iron located at the top of the box. The floor boxes have covers which fit into the angle iron frame, with the covers typically being either steel plate or cast iron. More recently, cast aluminum has also been used as a material instead of steel plate or cast iron.

The installation of the typical floor box is made by first attaching the angle iron frame to the top of the floor box. The floor box is then set place and temporarily supported on concrete blocks or 2"×4" blocks, with the angle iron frame being located at the level at which the floor surface will be when the slab or floor is poured. Holes are cut into the sides and bottom of the floor box for connections to utilities. The utility lines are then run and plumbed, and are permanently connected to the floor box through the holes which were cut therein in the conventional manner.

Re-bar for the slab or floor is then installed, and the concrete for the slab or floor is then poured. The cement in the concrete permanently "glues" the floor box into the slab or floor, and the utility lines extending into the floor box serve as dowels to make the installation of the floor box permanent. The concrete completely surrounds the floor box, and is level with the angle iron frame. When the cover is placed on the floor box, it is at the same level as the concrete slab or floor.

Thus, when the floor box is not being used, it serves as a part of the floor surface, and may be walked on or driven over. Since it is necessary for delivery trucks to drive onto the floor to deliver loads of materials for a convention or exhibit, the covers must be able to support heavy loads. The design criteria used for wheel loading is "highway" wheel loads, which are approximately 15,000 pounds over a 9 inch by 15 inch footprint. Some floor box covers are damaged or destroyed by the greater wheel loads imposed by forklifts, particularly hard-wheeled forklifts. Such loads can also damage a floor box to the point where it may require replacement.

One of the most serious problems encountered with floor boxes is corrosion. Since the floor boxes are typically made of steel, they can and do rust, particularly in northern climates where they are exposed to salt-laden water from melted snow picked up by the trucks on the highways. The water drips into the floor boxes, where the salt tends to greatly accelerate the rusting process. Such corrosion eventually results in the floor box deteriorating to a point at which it must be replaced.

Other problems which can result in the floor box needing to be replaced are fire, obsolescence, or physical damage caused by misuse. It will at once be appreciated by those skilled in the art that when the floor box is either unusable or when it has deteriorated to a certain point, it must be replaced. In addition, the facility may decide to upgrade their exhibitor services, but to do so means that the floor box would have to be replaced. In order to replace a floor box, the concrete slab or floor must be jackhammered to remove the box and to obtain access to the supply lines and plumbing. Frequently, the supply lines and plumbing are damaged in the process of removing the floor box, further exacerbating the replacement process. Replacement of a floor box is a difficult, time consuming, and expensive process, to say the least.

It is accordingly the primary objective of the present invention that it provide a floor box which may be relatively easily removed from the concrete slab or floor and the cover frame without requiring the slab or floor to be broken. It is a closely related objective of the removable floor box of the present invention that it may be reinstalled in the slab or floor and the cover frame without requiring any cement to be poured and with a similar degree of ease to that associated with its removal. It is a further primary objective of the present invention that the fittings connected to the removable floor box can be removed from the old floor box and reconnected to the new floor box easily and without necessitating the replacement of any of the lines or plumbing.

It is a further objective of the removable floor box of the present invention that it be provided with a cover which fits on the floor box in a water resistant manner, even though there are access doors which are located in the cover. It is a still further objective of the removable floor box of the present invention that the cover be designed so that it can support even large loads (such as a forklift with its maximum load, about to tip over so that most of its weight is on its front wheels) without damage to either the cover or the floor box. It is yet another objective of the removable floor box of the present invention that it may be made of a material which is completely resistant to corrosion.

The removable floor box of the present invention must be of a construction which is both durable and long lasting, and it should also require little or no maintenance to be provided by the user throughout its operating lifetime. In order to enhance the market appeal of the removable floor box of the present invention, it should also be of relatively inexpensive construction to thereby afford it the broadest possible market. Finally, it is also an objective that all of the aforesaid advantages and objectives of the removable floor box of the present invention be achieved without incurring any substantial relative disadvantage.

SUMMARY OF THE INVENTION

The disadvantages and limitations of the background art discussed above are overcome by the present invention. With this invention, a removable floor box having four main components is disclosed and taught. The four components of the removable floor box of the present invention are a floor box of unique design, a rim member which may be mounted onto the open top of the floor box, a cover frame fitting into the rim member in a manner which is flush to the floor, and covers which fit into apertures in the cover frame.

The floor box is open only on the top side thereof (as is conventional), and has four vertically oriented guide tubes which are respectively installed in the four corners of the box on the inside thereof. The four guide tubes are each sealed at the top end thereof and are open at the bottom end thereof. The open bottom ends of the four guide tubes respectively communicate with four axially oriented apertures located in the bottom of the box beneath the guide tubes.

Four threaded rods are used to support the floor box of the present invention in place, with a nut and washer being mounted on each of the four threaded rods to adjust the height of the floor box. The top ends of the four threaded rods are respectively inserted into the four guide tubes, with the floor box thereby resting on the washers and nuts mounted on the four threaded rods.

The sides and the bottom of the floor box of the present invention are wrapped with ⅛ inch thick sheets of extruded polystyrene expanded foam material, such as the material marketed by Dow Chemical Company under the trademark STYROFOAM. The sheets of extruded polystyrene expanded foam material may be retained in place on the sides and the bottom of the floor box by pieces of string wrapped around the floor box. The sheets of extruded polystyrene expanded foam material will act to prevent the concrete from gluing the floor box in place when the concrete is poured.

The utility lines and plumbing are run to the floor box, and are connected thereto through holes in the sides and bottom of the floor box. In a significant departure from the prior art, the connections to the utilities are all made from the inside of the floor box of the present invention. By so doing, the floor box of the present invention will be able to be disconnected from the fittings of the utility lines and plumbing from the inside thereof, thereby making it possible to remove the floor box from the utilities in order to remove it.

In another departure from the prior art, the floor box of the present invention is made of a corrosion resistant material such as PVC. As such, the guide tubes may be molded into the floor box if desired. In the preferred embodiment, the floor box of the present invention is made of white PVC (rather than gray, which is the standard color for floor boxes), which substantially improves visibility in the floor box. Since in normal use the floor box of the present invention will never be exposed to sunlight, it need not have the gray pigmentation normally used for PVC pigmentation to resist ultraviolet breakdown due to exposure to sunlight.

The rim member fits around the outer periphery of the floor box adjacent the top end thereof, and in cross section is shaped like a stretched "Z" rather than a simple "L" (which is the shape of conventional angle iron). The rim member is preferably made of steel, and in the preferred embodiment it is galvanized to make it resistant to corrosion. The top edge of the floor box thus fits inside the rim member, and is attached to the rim member by self-tapping bolts installed from the inside of the floor box. The concrete is poured around the floor box, and is leveled with the top of the rim member. The sheets of extruded polystyrene expanded foam material prevent the concrete from gluing the floor box in place when the concrete is poured. The sheets of extruded polystyrene expanded foam material and the string holding them in place around the floor box will disintegrate over time, leaving a ⅛ inch thick gap between the floor box and the concrete, and making removal of the floor box an easy task.

The cover frame is designed to transfer the load from wheels on the surface thereof to the concrete. As such, in the preferred embodiment it has a thick center beam (at least in larger sizes) to effectively carry loads as large as 16 tons on a 1 inch by 16 inch footprint. The cover frame of the preferred embodiment has two apertures therein which are used to support the covers. The cover frame is made of cast aluminum alloy in the preferred embodiment. A gasket placed into the rim effectively seals between the cover frame and the rim when the cover frame is installed onto the rim.

The covers are designed to provide access to the interior of the floor box, and as such have doors mounted therein on hinges. The doors in the covers may be swung downwardly into the interior of the floor box to allow for wires and hoses to extend from the floor box. The covers and doors are also designed to carry a load, in the preferred embodiment a load of as much as 32,000 pounds. Since they are smaller than the cover frame, they are also thinner and lighter (typically weighing about twenty pounds).

In the preferred embodiment, the covers also have handles which are retractable into a flush position on the covers. The handles are biased into this retracted position by springs, and may be opened by pressing at one end thereof to pop the other end up sufficiently to permit it to be grasped. Gaskets located in the cover under the handles effectively seal them when they are in their retracted position. No holes are exposed on the covers when the doors are closed and the handles are retracted.

It may therefore be seen that the present invention teaches a floor box which may be relatively easily removed from the concrete slab or floor and the cover frame without requiring the slab or floor to be broken. The removable floor box of the present invention may also be reinstalled in the slab or floor and the cover frame without requiring any concrete to be poured and with a similar degree of ease to that associated with its removal. The fittings connected to the removable floor box of the present invention can be removed from the old floor box and reconnected to the new floor box easily and without necessitating the replacement of any of the lines or plumbing.

The removable floor box of the present invention is provided with a cover which fits on the floor box in a water resistant manner, even though there are access doors which are located in the cover. The cover of the removable floor box of the present invention is designed so that it can support even large loads (such as a forklift with its maximum load, about to tip over so that most of its weight is on its front wheels) without damage to either the cover or the floor box.

If so desired, the removable floor box of the present invention may be made of a material which is completely resistant to corrosion.

The removable floor box of the present invention is of a construction which is both durable and long lasting, and which will require little or no maintenance to be provided by the user throughout its operating lifetime. The removable floor box of the present invention is also of relatively inexpensive construction to enhance its market appeal and to thereby afford it the broadest possible market. Finally, all of the aforesaid advantages and objectives of the removable floor box of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENTS

Before discussing the removable floor box of the present invention, it is helpful to briefly discuss the prior art.

Specifically, in order to fully understand the advantages offered by the present invention, the manner in which the prior art floor box, which was simply a steel box that was open on the top side thereof, was installed, and specifically how it was hooked up to electrical and plumbing lines, will be briefly discussed with reference to FIGS. 1 through 3.

Figure 1:
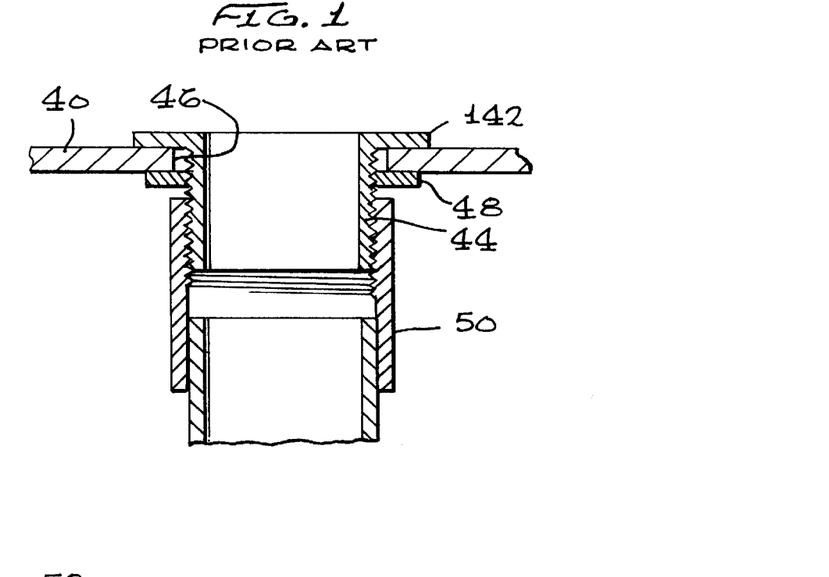
FIG. 1 is a cross-sectional view from the side of a drain plumbing connection as customarily made on the bottom of a prior art floor box.

Referring first to FIG. 1, a portion of the bottom of a floor box 40 is illustrated with plumbing for a drain connection installed. A drain fitting 42 having a cylindrical segment 44 projecting downwardly therefrom is installed in an aperture 46 in the floor box 40. The cylindrical segment 44 of the drain fitting 42 is threaded on the outside surface thereof. An annular gasket 48 is installed on the cylindrical segment 44 of the drain fitting 42 underneath the bottom of the floor box 40.

A locking ring 50 of cylindrical configuration having the interior threaded on the top portion thereof is screwed onto the threaded cylindrical segment 44 of the drain fitting 42. When the locking ring 50 is tightly secured on the cylindrical segment 44 of the drain fitting 42, the annular gasket 48 will be compressed to provide a watertight seal. A drain pipe 52 is inserted into the bottom of the locking ring 50, where it is retained in place by solvent bonding. Alternately, the bottom portion of the locking ring 50 may also be threaded on the inside thereof, and the top end of the drain pipe 52 may be threaded on the outside thereof, thereby allowing the drain pipe 52 to be screwed into the locking ring 50.

Figure 2:
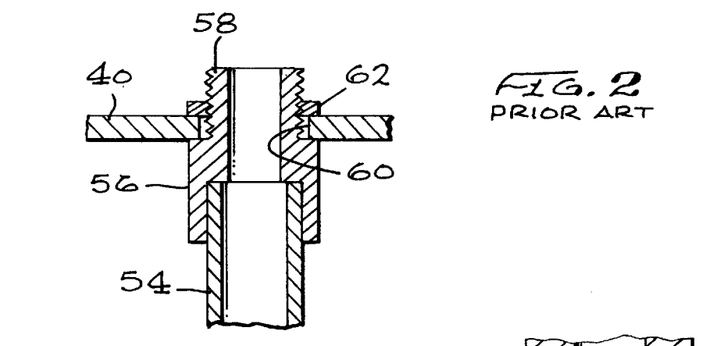
FIG. 2 is a cross-sectional view from the side of an electrical conduit connection as customarily made on the side of a prior art floor box.

Referring next to FIG. 2, a portion of the side of the floor box 40 is illustrated with fittings for an electrical connection installed. An electrical conduit segment 54 is inserted into one end of a box connector 56, where it is retained in place by solvent bonding. Alternately, the end of the box connector 56 may be threaded on the inside thereof, and the end of the electrical conduit segment 54 may be threaded on the outside thereof, thereby allowing the electrical conduit segment 54 to be screwed into the box connector 56.

The other end of the box connector 56 has a cylindrical segment 58 extending therefrom which is threaded on the outside thereof. The cylindrical segment 58 of the box connector 56 extends through an aperture 60 in the side of the floor box 40. A bonding locknut 62 is screwed onto the threaded cylindrical segment 58 of the box connector 56. If the conduit system running to the location of the floor box 40 is continuously metallic, then metal fittings would be used instead of plastic fittings, and a grounding bushing would be used instead of the bonding locknut 62.

Figure 3:
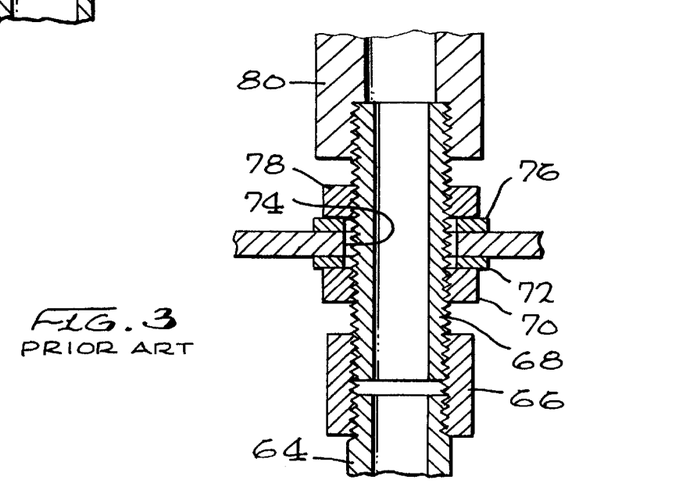
FIG. 3 is a cross-sectional view from the side of a water or air supply plumbing connection as customarily made on the bottom of a prior art floor box.

Referring now to FIG. 3, a portion of the bottom of the floor box 40 is illustrated with plumbing for a water or air supply connection installed. The water or air is supplied from a supply pipe 64, the end of which is threaded on the outside. One end of a connecting sleeve 66 which is threaded on the inside thereof is screwed onto the threaded end of the supply pipe 64. A threaded nipple 68 has one end thereof screwed into the other end of the connecting sleeve 66.

A nut 70 is screwed onto the threaded nipple 68, and a washer 72 is then placed onto the threaded nipple 68. The free end of the threaded nipple 68 is then inserted through an aperture 74 in the bottom of the floor box 40. A washer 76 is then placed onto the threaded nipple 68, and a nut 78 is screwed onto the threaded nipple 68 to retain it in place in the aperture 74 in the floor box 40. Finally, a valve body 80 is screwed onto the top end of the threaded nipple 68.

It will be appreciated by those skilled in the art that when the drain, electrical, and water or air supply connections illustrated in FIGS. 1 through 3 are installed, they will effectively secure the floor box 40 in place. The concrete (not shown herein) will secure the conduit and pipes in place, and the only way that the floor box 40 may be removed is by removing the concrete around the sides and the bottom of the floor box 40. In addition, of course, the concrete will also act as glue to retain the floor box 40 is place, making its removal impossible without breaking the concrete.

Figure 4:
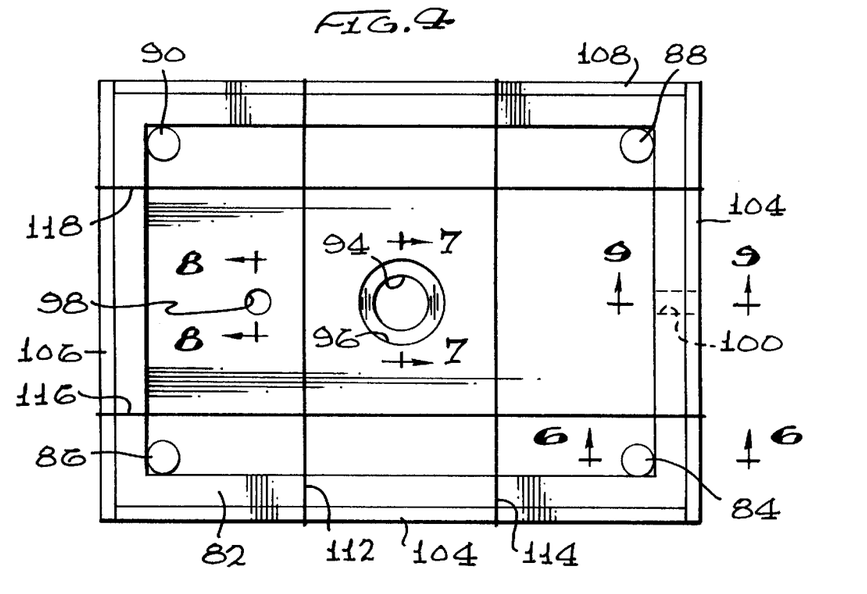
FIG. 4 is a top plan view of the removable floor box of the present invention, showing four guide tubes which are respectively installed in the four corners of the box on the inside thereof, two apertures located in the bottom of the removable floor box, and the location of an aperture located in a side wall of the removable floor box, and also showing four sheets of extruded polystyrene expanded foam material placed on the exterior of the removable floor box on the sides thereof.
Figures 5, 6:
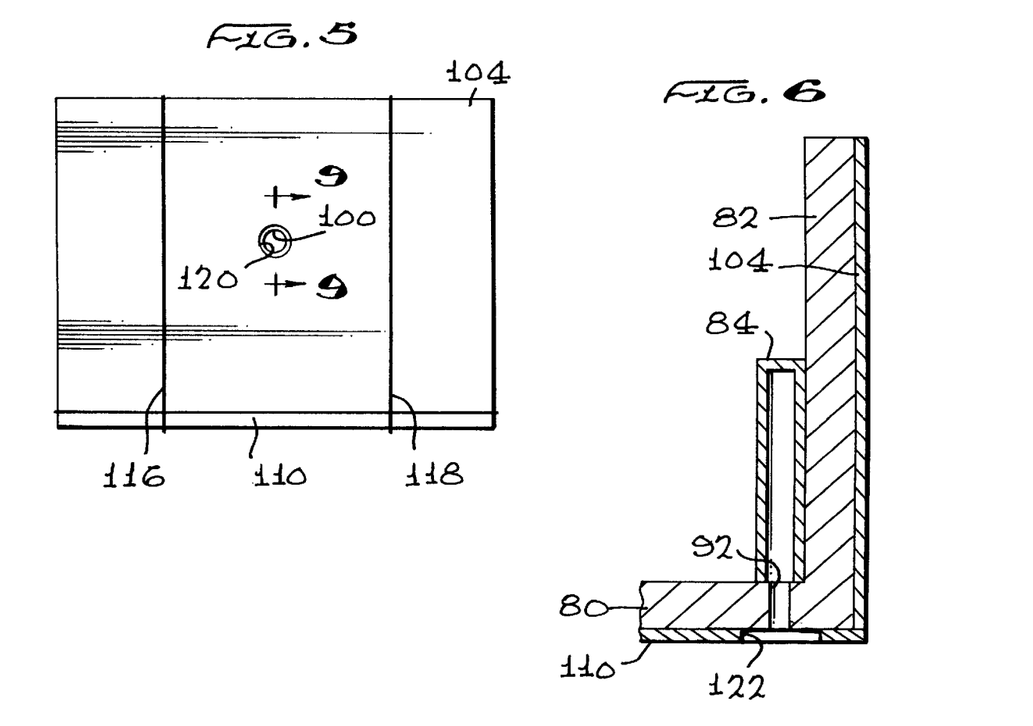
FIG. 5 is a side view of the removable floor box illustrated in FIG. 4, showing the location of the aperture located in the side wall of the removable floor box, the sheet of extruded polystyrene expanded foam material placed on the side of the removable floor box, and also showing another sheet of extruded polystyrene expanded foam material placed on the exterior of the removable floor box on the bottom thereof.
FIG. 6 is a partial cross-sectional view of the removable floor box illustrated in FIGS. 4 and 5, showing one of the four guide tubes as being sealed at the top thereof and open at the bottom end thereof, the open bottom end of the guide tube being in communication with an aperture extending through the bottom of the removable floor box.

The preferred embodiment of the removable floor box of the present invention has four primary components: a floor box of unique design, a rim member which may be mounted to the open top of the floor box, a cover frame fitting into the rim member in a manner which is flush to the floor, and covers which fit into apertures which are located in the cover frame. The first of these components is illustrated in FIGS. 4 through 6, which show a removable floor box 82. The removable floor box 82 has four sides and a bottom, and is open on the top side thereof.

As shown in FIG. 4, the removable floor box 82 has four vertically oriented guide tubes 84, 86, 88, and 90 which are respectively installed in the four corners of the removable floor box 82 on the inside thereof. The four guide tubes 84, 86, 88, and 90 are approximately half as tall as the removable floor box 82, and are located in the removable floor box 82 with their bottom ends on the bottom of the removable floor box 82, as best shown in FIG. 6.

The four guide tubes 84, 86, 88, and 90 are each sealed at the top end thereof, and are each open at the bottom end thereof. The open bottom ends of the four guide tubes 84, 86, 88, and 90 are sealed to the bottom of the removable floor box 82 and respectively communicate with four axially oriented apertures located in and extending through the bottom of the removable floor box 82 beneath the guide tubes. One of these four apertures, which is illustrated in FIG. 6, is identified by the reference numeral 92, and is in communication with the guide tube 84. The other three apertures, although not illustrated in the figures, are identical in size and configuration to the aperture 92.

In the preferred embodiment, the removable floor box 82 is made of PVC rather than of metal. While floor boxes have in the past been made of PVC, the standard color used has typically been ANSI 70 gray, or battleship gray. As mentioned above, this color has been used because there is a pigment in it that resists ultraviolet breakdown of the PVC when exposed to sunlight. Since floor boxes are never exposed to sunlight in that they are located below the floor, they need not be gray. Accordingly, in the preferred embodiment, the removable floor box 82 is made of white PVC to substantially improve visibility therein.

The removable floor box 82 may be made of slabs of PVC which are welded together. In this case, the four guide tubes 84, 86, 88, and 90 are also welded into place inside the removable floor box 82, with the bottom ends sealed around the apertures in the bottom of the removable floor box 82. For example, the open bottom end of the guide tube 84 is welded to the removable floor box 82 around the aperture 92 in the removable floor box 82. Alternately, the removable floor box 82 together with the four guide tubes 84, 86, 88, and 90 may be molded in a single piece.

An aperture 94 which is shown as being centrally located in the bottom of the removable floor box 82 will be used to install fittings for a drain therein. It should be noted that drains in floor boxes are typically installed in a corner of the floor box. In some applications, the floor box may have multiple compartments located therein, e.g. separate compartments for the air and water supplies as well as a separate electrical compartment. In such applications, each compartment would have its own drain. It will be appreciated by those skilled in the art that the example shown herein is equally applicable to such multiple drain applications, with the drains varying only in size and placement.

Located in the bottom of the removable floor box 82 on the inside thereof is a circular recess 96 which surrounds the aperture 94. This recess will be used to receive a strainer which is mounted over the drain, as will become evident below in conjunction with the discussion accompanying FIG. 7. Also located in the bottom of the removable floor box 82 is an aperture 98 which will be used to install fittings for a water or air supply line. Located in one side of the removable floor box 82 is an aperture 100 which will be used to install fittings for an electrical supply line.

The four sides of the removable floor box 82 are covered on the outside thereof with four sheets of ⅛ inch thick sheets of extruded polystyrene expanded foam material 102, 104, 106, and 108, which may be, for example, the material marketed by Dow Chemical Company under the trademark STYROFOAM. Similarly, the bottom of the removable floor box 82 is covered on the outside thereof with a sheet of extruded polystyrene expanded foam material 110. The sheets of extruded polystyrene expanded foam material 102, 104, 106, 108, and 110 may be retained in place by segments of string 112, 114, 116, and 118. It will be appreciated by those skilled in the art that other means may be used to retain the sheets of extruded polystyrene expanded foam material 102, 104, 106, 108, and 110 in place. For example, masking tape (not illustrated herein) may be used instead of the segments of string 112, 114, 116, and 118.

When the removable floor box 82 is installed in a floor and concrete is poured around the removable floor box 82, the sheets of sheets of extruded polystyrene expanded foam material 102, 104, 106, 108, and 110 will act to prevent the cement in the concrete from gluing the floor box 82 in place when the concrete is poured. Over time following the installation of the removable floor box 82 in the concrete floor, the sheets of sheets of extruded polystyrene expanded foam material 102, 104, 106, 108, and 110 and the segments of string 112, 114, 116, and 118 will disintegrate, leaving a ⅛ inch thick air gap around the removable floor box 82. This air gap will ensure that the removable floor box 82 is easily removable from the concrete.

Referring particularly to FIG. 5, it may be seen that the sheet of extruded polystyrene expanded foam material 104 on the side of the removable floor box 82 has an aperture 120 which is coaxial with the aperture 100 in the removable floor box 82. There are four apertures in the sheet of extruded polystyrene expanded foam material 110 on the bottom of the removable floor box 82 which are coaxial with the four apertures in the bottom of the removable floor box 82 which are in communication with the interiors of the guide tubes 84, 86, 88, and 90. One of these apertures which is shown in FIG. 6 is identified with the reference numeral 122, and is coaxial with the aperture 92 in the bottom of the removable floor box 82.

Figure 7:
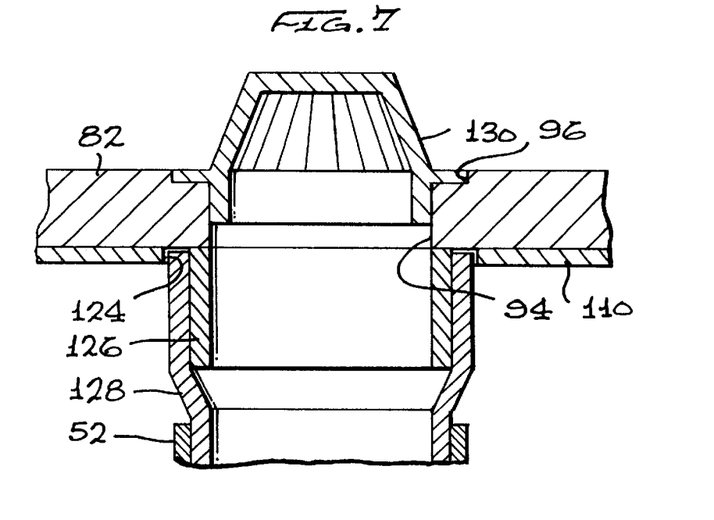
FIG. 7 is a cross-sectional view from the side of a drain plumbing connection as made on the bottom of the removable floor box illustrated in FIGS. 4 and 5.

Referring next to FIG. 7, the installation of the drain plumbing connection to the removable floor box 82 is illustrated. It may be seen that the sheet of extruded polystyrene expanded foam material 110 on the bottom of the removable floor box 82 has an aperture 124 located there which is coaxial with the aperture 94 in the bottom of the removable floor box 82. A segment of PVC pipe 126 is welded to the bottom of the removable floor box 82 around the aperture 94 therein.

A PVC coupling 128 fits over the segment of PVC pipe 126, thereby engaging it. The PVC coupling 128 is not glued to the segment of PVC pipe 126, thereby enabling the segment of PVC pipe 126 to be pulled out of the PVC coupling 128 to disengage it from the PVC coupling 128. The PVC coupling 128 is connected to the drain pipe 52, which is of conventional design (see FIG. 1). It will be appreciated by those skilled in the art that the drain plumbing connection of the removable floor box 82 will not inhibit the easy removal of the removable floor box 82 once it has been installed in a concrete floor, since the concrete will surround only the PVC coupling 128, and not the segment of PVC pipe 126.

Completing the drain plumbing is a PVC domed strainer 130 which fits into the circular recess 96 in the removable floor box 82 surrounding the aperture 94. Since the PVC domed strainer 130 is installed in this manner into the circular recess 96, all water located in the removable floor box 82 will immediately drain out, leaving no pools in the bottom of the removable floor box 82. Alternately, a flat strainer (not illustrated herein) may be used in some drain applications.

Figure 8:
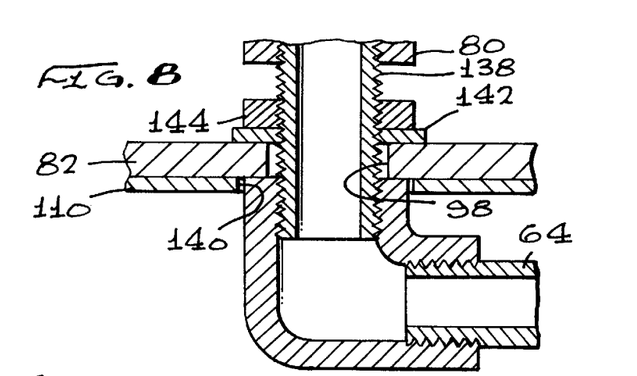
FIG. 8 is a cross-sectional view from the side of an electrical conduit connection as made on the side of the removable floor box illustrated in FIGS. 4 and 5.

Referring now to FIG. 8, the installation of an electrical conduit connection to the removable floor box 82 is illustrated. The electrical conduit segment 54, which is of conventional design (see FIG. 2), is inserted into one end of a coupling member 132, where it is retained in place by solvent bonding. Alternately, the end of the coupling member 132 which is connected to the electrical conduit segment 54 may be threaded on the inside thereof, and the end of the electrical conduit segment 54 may be threaded on the outside thereof, thereby allowing the electrical conduit segment 54 to be screwed into the coupling member 132.

The other end of the coupling member 132 is threaded on the inside thereof, and abuts the outside wall of the removable floor box 82. A chase nipple 134 which is threaded on the outside thereof at one end thereof is then inserted from the inside of the removable floor box 82 through the aperture 100 in the side wall of the removable floor box 82, and then is screwed into the threaded end of the coupling member 132. Alternately, a close nipple (not shown herein) and a locknut (not shown herein) could be used instead of the chase nipple 134.

It will be appreciated by those skilled in that art that although only a single electrical conduit connection to the removable floor box 82 is illustrated herein, typical floor boxes will have several connections. For example, electrical connections for telephone, data, and audio/visual services are made in addition to electrical power connections. All of these connections are typically run through electrical conduit.

In order to remove the removable floor box 82, only the chase nipple 134 need be removed to free the removable floor box 82 from the electrical conduit connection. Thus, it will be appreciated by those skilled in the art that the electrical conduit connection of the removable floor box 82 will not inhibit the easy removal of the removable floor box 82 once it has been installed in a concrete floor, since the concrete will surround only the electrical conduit segment 54 and the coupling member 132, which both remain in the concrete when the removable floor box 82 is removed.

Figure 9:
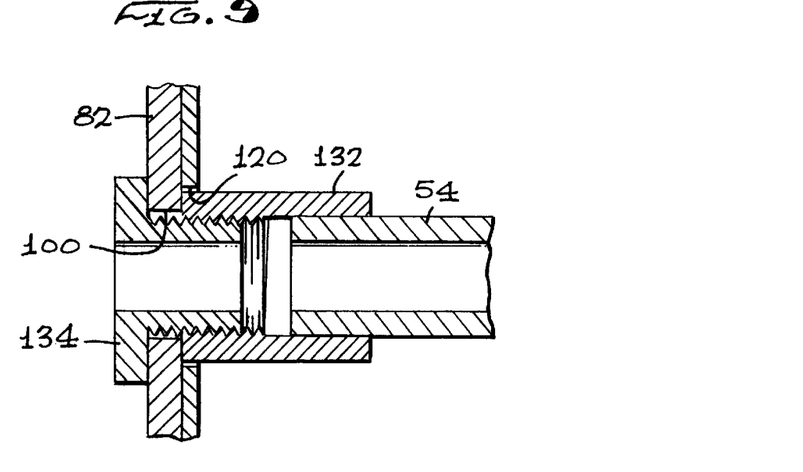
FIG. 9 is a cross-sectional view from the side of a water or air supply plumbing connection as made on the bottom of the removable floor box illustrated in FIGS. 4 and 5.

Referring now to FIG. 9, the installation of a water or air supply plumbing connection to the removable floor box 82 is illustrated. The supply pipe 64, which is of conventional design but which is oriented horizontally rather than vertically as in FIG. 3, has an end which is threaded on the outside thereof. An elbow 136 has both ends threaded on the inside thereof. The threaded end of the supply pipe 64 is inserted into one end of the elbow 136, and the elbow 136 is then screwed onto the supply pipe 64. If the supply pipe 64 is PVC, the elbow 136 may also be PVC with a socket on one end for adhesive installation onto the PVC supply pipe.

A threaded nipple 138 is then screwed into the other end of the threaded nipple 138. It may be seen that the sheet of extruded polystyrene expanded foam material 110 on the bottom of the removable floor box 82 has an aperture 140 located there which is coaxial with the aperture 98 in the bottom of the removable floor box 82. The threaded nipple 138 is inserted through the aperture 98 in the bottom of the removable floor box 82. Note that no nut is mounted on the threaded nipple 138 below the removable floor box 82. This enables the threaded nipple 138 to be removed from the socket elbow 136 without first removing the removable floor box 82, should it even become necessary to do so.

A washer 142 is then placed onto the threaded nipple 138, and a nut 144 is screwed onto the threaded nipple 138 to retain it in place in the aperture 98 in the removable floor box 82. Finally, the valve body 80 is screwed onto the top end of the threaded nipple 138.

In order to remove the removable floor box 82, only the valve body 80, the nut 144 and the washer 142 need be removed from the threaded nipple 138 to free the removable floor box 82 from the water or air supply connection. Thus, it will be appreciated by those skilled in the art that the water or air supply connection of the removable floor box 82 will not inhibit the easy removal of the removable floor box 82 once it has been installed in a concrete floor, since the concrete will surround only the supply pipe 64 and the socket elbow 136, which both remain in the concrete when the removable floor box 82 is removed.

Figures 10, 11:
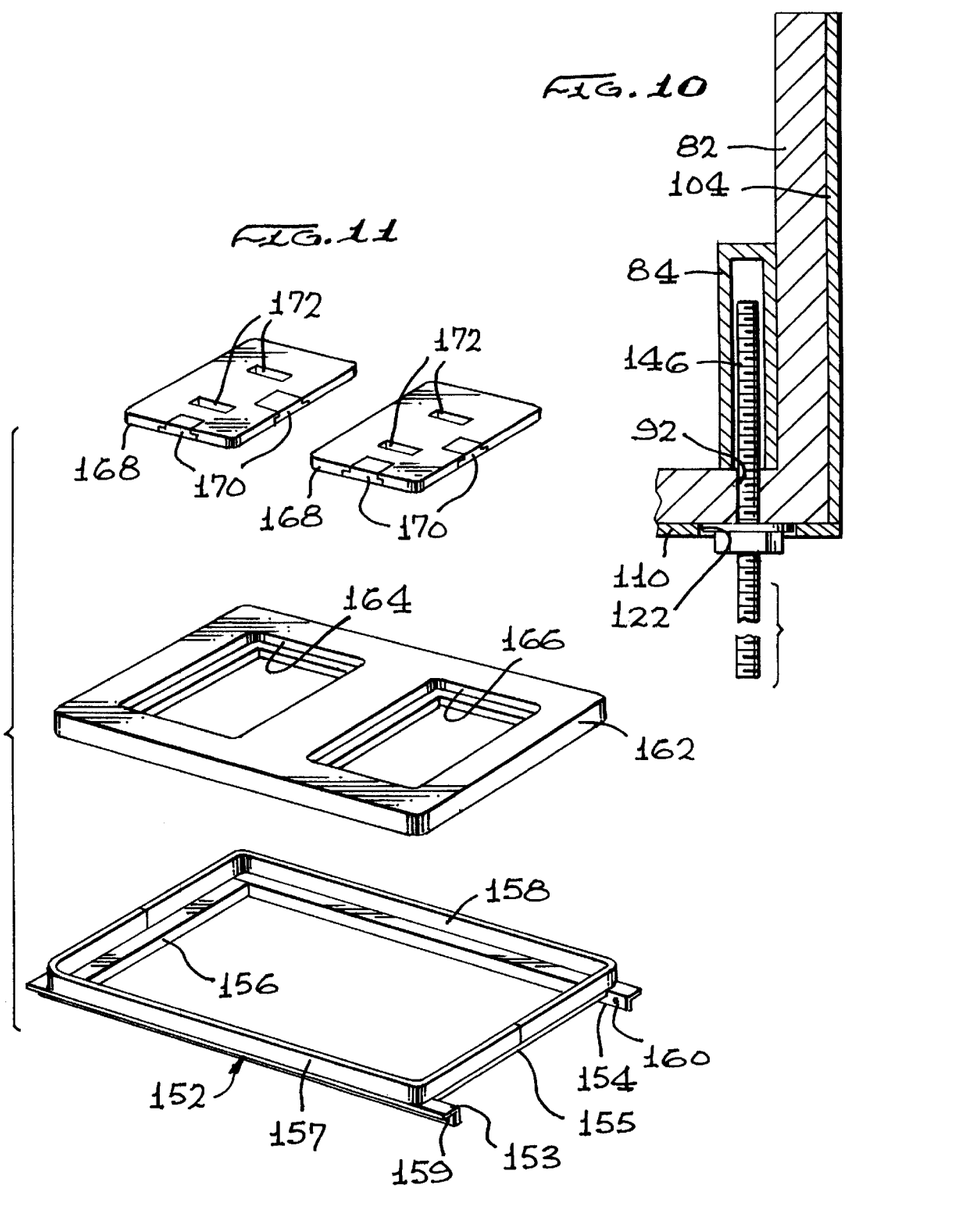
FIG. 10 is a partial cross-sectional view of the removable floor box similar to the view illustrated in FIG. 6, showing a threaded rod extending through the aperture in the bottom of the removable floor box and into the open bottom end of the guide tube, and also showing a washer and nut located on the threaded rod at an intermediate location thereon to support the corner of the removable floor box thereupon.
FIG. 11 is an exploded view showing a rim member which will fit around the outer periphery of the floor box illustrated in FIGS. 4 and 5 adjacent the top end thereof, a cover frame which will fit into the rim member above the removable floor box, and two covers which will fit into two corresponding apertures located in the cover frame.

Referring now to FIG. 10, the manner in which the removable floor box 82 is installed is illustrated. This would be done prior to making the final electrical and water and/or air supply connections, which have been illustrated in FIGS. 4 through 6. A threaded rod 146 has a nut 148 and a washer 150 mounted thereupon. An end of the threaded rod 146 is inserted into the aperture 92 in the bottom of the removable floor box 82, and into the open bottom end of the guide tube 84. The corner of the removable floor box 82 in which the guide tube 84 is located rests upon the washer 150, which in turn rests upon the nut 148 on the threaded rod 146.

Note that the end of the threaded rod 146 extending into the guide tube 84 does not extend to the closed end of the guide tube 84. This allows the nut 148 to be used to adjust the height of the corner of the removable floor box 82 in which the guide tube 84 is located. Three additional threaded rod 146, nut 148, and washer 150 assemblies (not shown herein) will be used to support the other three corners of the removable floor box 82 in similarly adjustable fashion. The four threaded rod 146, nut 148, and washer 150 assemblies may be used to level the removable floor box 82. Following the position of the removable floor box 82 being properly set, the final electrical conduit and plumbing connections may be made as illustrated in FIGS. 4 through 6, securing the removable floor box 82 in position prior to the concrete being poured.

Referring next to FIG. 11, the remaining components of the removable floor box of the present invention are illustrated. First, a rim member 152 which will fit around the outer periphery of the floor box 82 (which is illustrated in FIGS. 4 and 5) adjacent the top end thereof is illustrated. The lower portion of the rim member 152 is formed by four angle iron segments 153, 154, 155, and 156 which are welded together with the downwardly extending ones of each of their respective sides being located at the inside of the rim member 152.

Two U-shaped flanges 157 and 158 made of flat bar stock which is bent into the U-shaped configuration are welded together at the ends thereof to form a flange having a rectangular configuration with rounded corners. The U-shaped flanges 157 and 158 are located immediately above the most outwardly extending portions of the four angle iron segments 153, 154, 155, and 156, and are welded onto the top side of the four angle iron segments 153, 154, 155, and 156. The U-shaped flanges 157 and 158 thereby form the upper portion of the rim member 152.

The longer opposite sides of the rim member 152 are defined by the two angle iron segments 153 and 154, which extend slightly beyond the ends of the angle iron segments 155 and 156. Located at each end of the angle iron segment 153 is an aperture 159 (one of which is illustrated in FIG. 11). Similarly, located at each end of the angle iron segment 154 is an aperture 160 (one of which is illustrated in FIG. 11). The apertures 159 and 160 will be used to thread re-bar (not shown herein) through, which will assist in retaining the rim member 152 (and the removable floor box 82 which will be fastened to the rim member 152) in place when concrete is poured. All of the components of the rim member 152 are made of galvanized steel to make them resistant to corrosion. This is essential, since the rim member 152 is not removable from the concrete once it has been installed.

Shown above the rim member 152 is a cover frame 162 forming part of a cover apparatus which will fit into the rim member 152 above the removable floor box 82. Two apertures 164 and 166 which are located in the cover frame 154 are illustrated. Finally, two covers 168 which will fit into the two apertures 164 and 166 which are located in the cover frame 162 are illustrated. Located in each of the covers 168 are two doors 170 and two handles 172.

Figure 12:
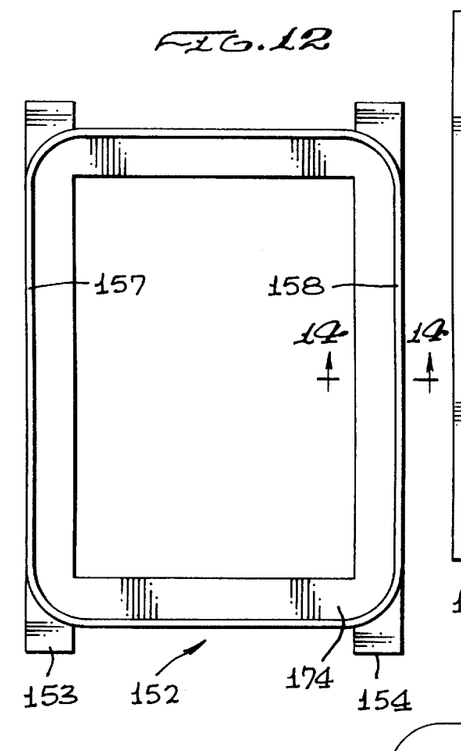
FIG. 12 is a top plan view of the rim member illustrated in FIG. 11.
Figure 13:
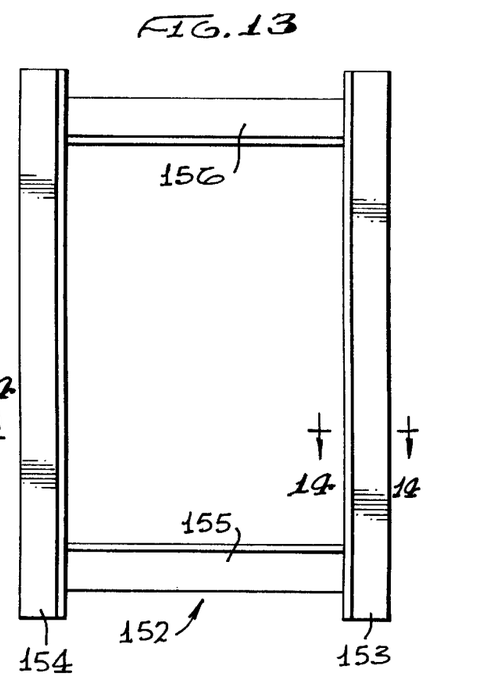
FIG. 13 is a bottom plan view of the rim member illustrated in FIGS. 11 and 12, showing two angle iron segments located on the bottom side thereof.
Figure 14:
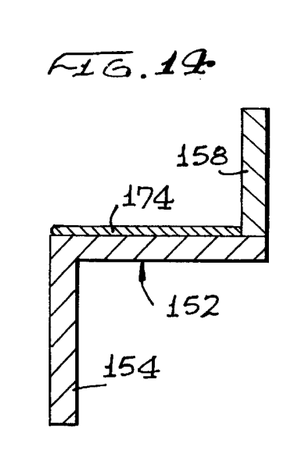
FIG. 14 is a cross-sectional view of a portion of the rim member and one of the angle iron segments.

Referring now to FIGS. 12 through 14, the rim member 152 is illustrated in greater detail. It may be seen that in cross section, the rim member 152 is shaped like a stretched "Z" with two right angle bends therein. The outer portion of the rim member 152 is formed by the U-shaped flanges 157 and 158, and is the portion which will surround the cover frame 162 (illustrated in FIG. 11) when it is installed. The portion of the rim member 152 defined by the U-shaped flanges 157 and 158 is rectangular in configuration with rounded corners.

The inner portion of the rim member 152 is defined by the angle iron segments 153, 154, 155, and 156 to be rectangular in configuration, and will surround the top portions of the sides of the removable floor box 82 (illustrated in FIGS. 4 and 5), as will become evident below in conjunction with the discussion of FIG. 27. Located on the upper surfaces of the angle iron segments 153, 154, 155, and 156 of the rim member 152 upon which the cover frame 162 will sit is a gasket 174, best shown in FIG. 14.

Figure 15:
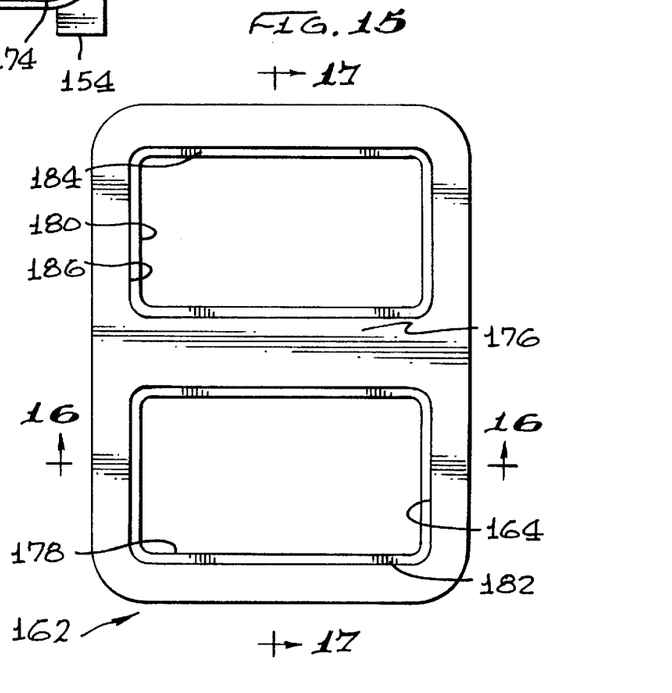
FIG. 15 is a top plan view of the cover frame illustrated in FIG. 11, showing two large apertures located therein to receive the covers.
Figure 16:
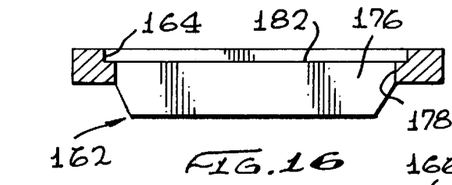
FIG. 16 is a first cross-sectional view of the cover frame illustrated in FIGS. 11 and 15, showing the configuration of the center beam of the cover frame.
Figure 17:
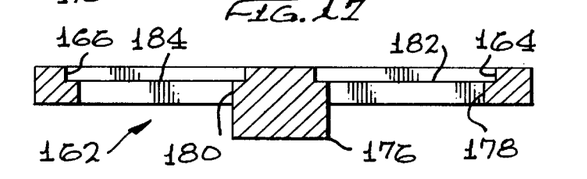
FIG. 17 is a second cross-sectional view of the cover frame illustrated in FIGS. 11, 15, and 16, showing the configuration of the large apertures located therein as well as the cross-sectional configuration of the center beam.

Referring next to FIGS. 15 through 17, the cover frame 162 is illustrated in greater detail. The function of the cover frame 162 is to transfer the load from the covers 168 (illustrated in FIG. 11) to the rim member 152 (illustrated in FIGS. 12 through 14) and thereby to the concrete in which the rim member 152 is mounted. Accordingly, the cover frame 162 has a crossbar 176 which extends between opposite sides of the cover frame 162 and is located between the apertures 164 and 166 to support very heavy loads.

Note that the aperture 164 in the cover frame 162 has a recessed ledge 178 extending inwardly therefrom to support one of the covers 168 (illustrated in FIG. 11) thereupon when the cover 168 is installed into the aperture 164. Similarly, the aperture 166 in the cover frame 162 has a recessed ledge 180 extending inwardly therefrom to support the other one of the covers 168 thereupon when the cover 168 is installed into the aperture 166. The apertures 164 and 166 are rectangular in configuration with rounded corners, and the apertures defined by the ledges 178 and 180 are also rectangular in configuration with rounded corners.

Located on top of the ledge 178 in the aperture 164 is a gasket 182. Similarly, located on top of the ledge 180 in the aperture 166 is a gasket 184. When the covers 168 are installed in the apertures 164 and 166, they fit in a flush manner thereupon. Similarly, when the cover frame 162 is installed in the rim member 152 (illustrated in FIGS. 12 through 14), it will fit flush with the concrete floor which is poured around the rim member 152.

Figure 18:
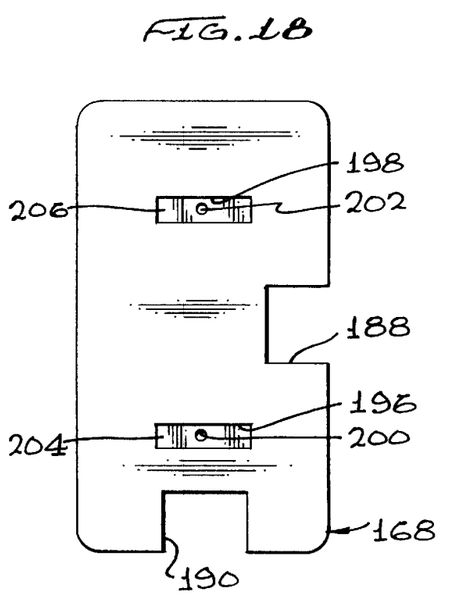
FIG. 18 is a top plan view of one of the covers illustrated in FIG. 11, showing two notches located in the sides thereof for receiving two doors respectively therein, and also showing two recesses for containing two handles respectively therein.
Figure 19:
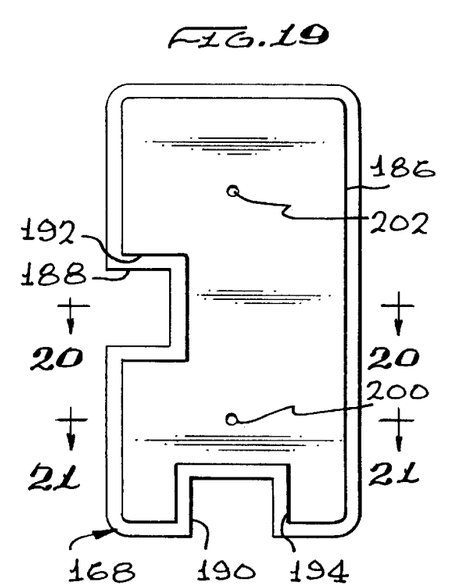
FIG. 19 is a bottom plan view of the cover illustrated in FIG. 18.
Figure 20:
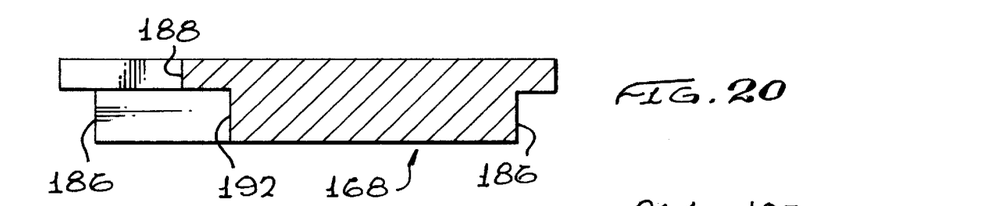
FIG. 20 is a first cross-sectional view of the cover illustrated in FIGS. 18 and 19, showing the cross-sectional detail of one of the notches located in a side edge of the cover for receiving a door therein.

Referring now to FIGS. 18 through 21, one of the covers 168 is illustrated with the doors 170 and the handles 172 removed therefrom. It may be seem at once that the cover 168 has a recessed area 186 extending around the entire periphery thereof on its bottom side. The upper portion of the cover 168 thereby extends outwardly further than does the lower portion of the cover 168. Both the upper portion of the cover 168 and the lower portion of the cover 168 have rounded corners, as best shown in FIG. 19. When the cover 168 is installed in one of the apertures 164 and 166 in the cover frame 162 (best illustrated in FIGS. 11, 15, and 17), the upper portion of the cover 168 will rest upon one of the ledges 178 and 180 in the apertures 164 and 166 (FIGS. 11, 15, and 17), respectively, and the lower portion will extend through the aperture defined by the ledges 178 and 180, respectively, which is rectangular with rounded corners. In this manner, the cover 168 will fit flush with the upper surface of the cover frame 162.

Located in two adjacent sides of the cover 168 are two rectangular notches 188 and 190 into which the doors 170 (illustrated in FIG. 11) will fit. Located in the cover 168 and surrounding the rectangular notches 188 and 190 on the bottom side of the cover 168 are recessed areas 192 and 194, respectively. The recessed area 192 extends around the entire periphery of the rectangular notch 188 on the bottom side of the cover 168. Similarly, the recessed area 194 extends around the entire periphery of the rectangular notch 190 on the bottom side of the cover 168. The upper portion of the cover 168 around the rectangular notches 188 and 190 thereby extends outwardly further than does the lower portion of the cover 168 around the rectangular notches 188 and 190.

Figure 21:
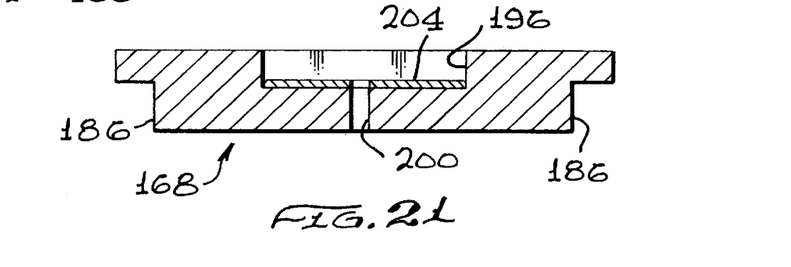
FIG. 21 is a second cross-sectional view of the cover illustrated in FIGS. 18 and 19, showing the cross-sectional detail of one of the recesses located in the top side thereof for receiving a handle therein.

Located in the top side of the cover 168 as shown in FIGS. 18 and 21 are two elongated rectangular recesses 196 and 198 into which the handles 172 (illustrated in FIG. 11) will fit. The elongated rectangular recess 196 has an aperture 200 located centrally therein, which aperture 200 extends through the cover 168. Similarly, the elongated rectangular recess 196 has an aperture 202 located centrally therein, which aperture 202 extends through the cover 168. Located in the bottom of the elongated rectangular recess 196 around the aperture 200 is a gasket 204. Similarly, located in the bottom of the elongated rectangular recess 198 around the aperture 202 is a gasket 206.

Figure 22:
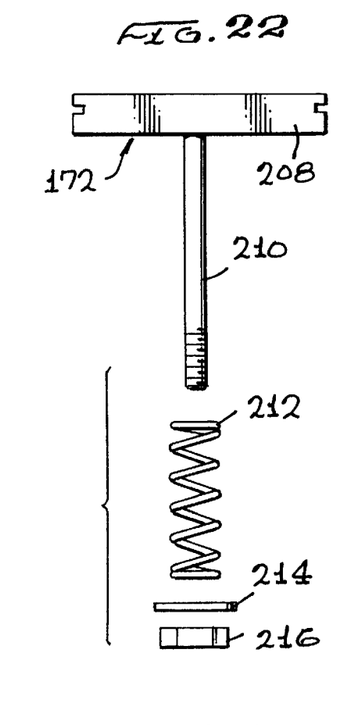
FIG. 22 is an exploded plan view of a handle for installation into one of the recesses located in the top side of the cover illustrated in FIGS. 18 and 21, showing a shaft mounted onto the bottom side of the handle, and a spring, a washer, and a nut for installation onto the threaded end of the shaft opposite the handle.
Figure 23:
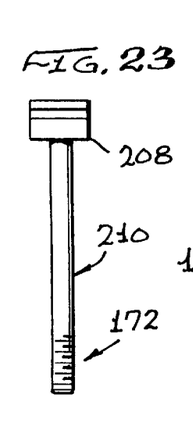
FIG. 23 is a side view of the handle illustrated in FIG. 22.

Referring next to FIGS. 22 and 23, the handle 172 is illustrated, together with its mounting hardware (the latter is shown only in FIG. 23). The handle 172 has a handgrip member 208 which is sized to removably fit within one of the elongated rectangular recesses 196 and 198 in the cover 168 (illustrated in FIGS. 18 and 21).

For purposes of example herein, the fit of the handle 172 into the elongated rectangular recess 196 will be discussed. The handle 172 fits into the elongated rectangular recess 196 in a manner such that the handgrip member 208 of the handle 172 is flush with the top surface of the cover 168. Extending from the bottom of the handgrip member 208 in the center thereof is a shaft 210 which is threaded at the end opposite its point of attachment to the handgrip member 208.

The diameter of the shaft 210 is substantially smaller than the diameter of the apertures 200 and 202 (illustrated in FIGS. 18 and 21) which are respectively located in the elongated rectangular recesses 196 and 198 in the cover 168. This allows the shaft 210 to pivot slightly when the shaft 210 is installed, for example, in the aperture 200 in the elongated rectangular recess 196 in the cover 168. In the preferred embodiment, the diameter of the shaft 210 is ¼ inch, the diameter of the aperture 200 is ⅜ inch, and the aperture 200 is ½ inch deep.

When installed, the handgrip member 208 lies for example in the elongated rectangular recess 196 with its top surface flush with the top surface of the cover 168, and with the shaft 210 extending through the aperture 200 at the bottom of the elongated rectangular recess 196 in the cover 168. The gasket 204 (illustrated in FIGS. 18 and 21) provides a water resistant seal. A spring 212 is mounted on the portion of the shaft 210 which extends below the cover 168, and a washer 214 and a nut 216 are used to retain the spring 212 on the shaft 210.

The force of the spring 212 will act to retain the handle 172 in place in the elongated rectangular recess 196 in the cover 168. By pressing one end of the handgrip member 208, the gasket 204 will compress slightly, causing the other end of the handgrip member 208 to move up above the surface of the cover 168 just enough to allow it to be grasped to pull the handgrip member 208 up out of the elongated rectangular recess 196. By pulling the handle 172 to compress the spring 212, the handle 172 may be used to support one end of the cover 168 to lift it out of its position on the cover frame 162 (illustrated in FIG. 11).

In the preferred embodiment, a recess 218 is machined into each end of the handgrip member 208 just below the top surface of the handgrip member 208. These recesses provide a place to get a grip on one end of the handgrip member 208 when the other end is depressed, thereby facilitating lifting the handgrip member 208 out of the elongated rectangular recess 196 in the cover 168.

Figure 24:
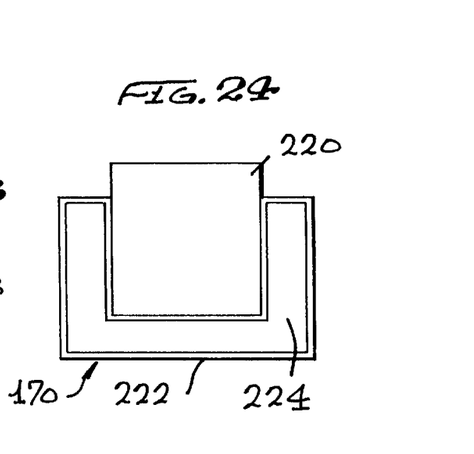
FIG. 24 is a top plan view of one of the doors for installation into one of the notches located in the top side of the cover illustrated in FIGS. 18 and 21.
Figure 25:
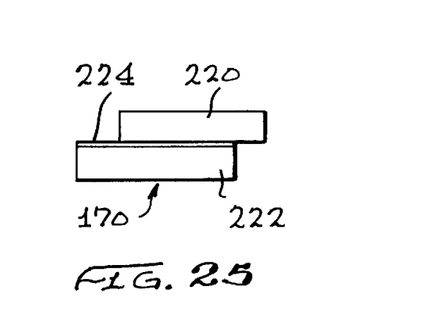
FIG. 25 is a side plan view of the door illustrated in FIG. 24.
Figure 26:
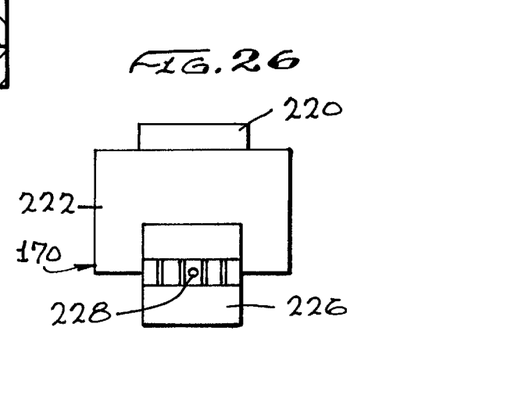
FIG. 26 is a bottom plan view of the door illustrated in FIGS. 24 and 25, also showing a hinge mounted onto the bottom side of the door.

Referring now to FIGS. 24 through 26, one of the doors 170 is shown in detail. The upper portion of the cable access door 170, which is referred to by the reference numeral 220, is of a size to fit into one of the rectangular notches 188 or 190 in the cover 168. For purposes of example herein, the fit of the upper portion 220 of the cable access door 170 into the rectangular notch 188 in the cover 168 will be discussed.

The lower portion of the cable access door 170, which is referred to by the reference numeral 170, extends beyond the surface of the upper portion 220 of the cable access door 170 on three sides thereof, and is designed to be received into the recessed area 192 surrounding the rectangular notch 188 in the cover 168. When the cable access door 170 is installed, the upper portion 220 of the cable access door 170 will fit into the rectangular notch 188 of the cover 168 and the lower portion 222 of the cable access door 170 will fit into the recessed area 192 of the cover 168.

A gasket 224 is located upon the upper side of the portion of the lower portion 222 of the cable access door 170 which extends beyond the upper portion 220 of the cable access door 170. The gasket 224 will provide a seal between the cable access door 170 and the cover 168 when the cable access door 170 is in its closed position (as the doors 170 are illustrated in FIG. 11).

The cable access door 170 is mounted onto the cover 168 using a hinge 226 as shown in FIG. 26. One side of the hinge 226 is mounted onto the bottom side of the lower portion 222 of the cable access door 170, and the other side would be mounted onto the bottom side of the cover 168 when the cable access door 170 is in position. The hinge 226 will allow the cable access door 170 to swing downwardly to open. In the preferred embodiment, the hinge 226 is a friction hinge, in which the ease of movement of the hinge may be adjusted with a screw 228. The hinge 226 may thus be adjusted to be sufficiently tight to maintain the position of the cable access door 170 against gravity.

Thus it will be appreciated that the cable access doors 170 open downwardly, which will be into the removable floor box 82 (illustrated in FIGS. 4 and 5). To open the cable access doors 170, the cover 168 (illustrated in FIG. 11) must first be removed from the cover frame 162. Since the cover 168 must be removed to make connections inside the removable floor box 82, this is not an unreasonable restriction.

Figure 27:
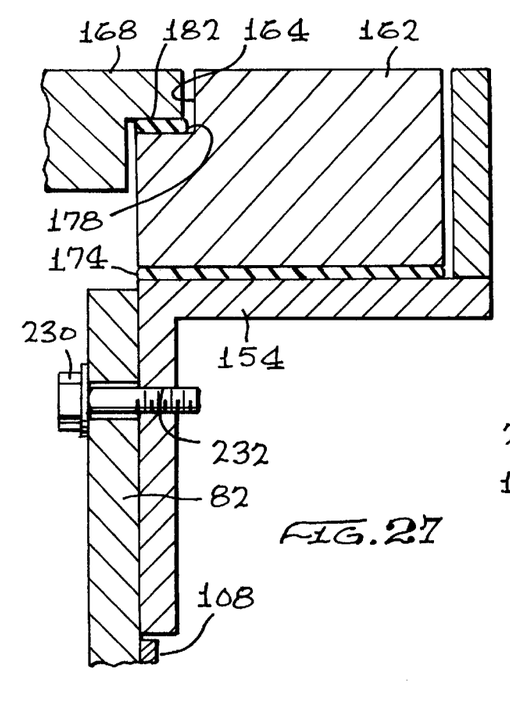
FIG. 27 is a partial cross sectional view of the removable floor box of the present invention from the side, showing the top end of the floor box illustrated in FIGS. 4 and 5 attached to the rim member illustrated in FIGS. 11 through 14 with a self-tapping bolt, and also showing the cover frame mounted in the rim member with a gasket located therebetween and one of the covers mounted in the cover frame with a gasket located therebetween.

Referring finally to FIG. 27, the assembly of several of the various components of the removable floor box of the present invention are illustrated. First, the removable floor box 82 is secured to the rim member 152 with a plurality of bolts 230, one of which is illustrated in FIG. 27. The bolts 230 are screwed into threaded apertures 232 located in at least two of the angle iron segments 153, 154, 155, and 156 (illustrated in FIG. 13). One such threaded aperture 232 is shown in FIG. 27 as being located in the angle iron segment 154.

The bolts 230 are installed from the interior of the removable floor box 82, thus presenting no impediment to the removal of the removable floor box 82 from the rim member 152 should it become necessary to remove it. In the preferred embodiment, the bolts 230 are made of stainless steel. In an alternate embodiment, self-tapping bolts (not illustrated herein) could be used instead of the bolts 230, with non-threaded apertures (also not illustrated herein) being used instead of the threaded apertures 232.

The cover frame 162 fits into the rim member 152 on top of the gasket 174, which is mounted in the rim member 152. The rim member 152 (including the angle iron segment 154 and the U-shaped flange 158 which are shown in FIG. 27), of course, is permanently secured in the concrete (not shown herein). The cover 168 fits into the aperture 164 in the cover frame 162, and rests on top of the gasket 182, which in turn is seated on the ledge 178 in the aperture 164 in the cover frame 162.

If desired, the cable access doors 170 and the cover frame 162 may have a recessed pattern located in the top surfaces thereof, to increase friction to foot traffic. Such a recessed pattern will, of course, not be so deep that it will allow one's shoe to become caught in it. For example, grooves may be located in the top surfaces of the cable access doors 170 and the cover frame 162 in a configuration which may be, for example, square-shaped or diamond-shaped. Such grooves may be, for example, 1/32 of an inch in depth.

It may therefore be appreciated from the above detailed description of the preferred embodiment of the present invention that it teaches a floor box which may be relatively easily removed from the concrete slab or floor and the cover frame without requiring the slab or floor to be broken. The removable floor box of the present invention may also be reinstalled in the slab or floor and the cover frame without requiring any concrete to be poured and with a similar degree of ease to that associated with its removal. The fittings connected to the removable floor box of the present invention can be removed from the old floor box and reconnected to the new floor box easily and without necessitating the replacement of any of the lines or plumbing.

The removable floor box of the present invention is provided with a cover apparatus, such as a cover which fits on the floor box in a water resistant manner, even though there are access doors which are located in the cover. The cover of the removable floor box of the present invention is designed so that it can support even large loads (such as a forklift with its maximum load, about to tip over so that most of its weight is on its front wheels) without damage to either the cover or the floor box. If so desired, the removable floor box of the present invention may be made of a material which is completely resistant to corrosion.

The removable floor box of the present invention is of a construction which is both durable and long lasting, and which will require little or no maintenance to be provided by the user throughout its operating lifetime. The removable floor box of the present invention is also of relatively inexpensive construction to enhance its market appeal and to thereby afford it the broadest possible market. Finally, all of the aforesaid advantages and objectives of the removable floor box of the present invention are achieved without incurring any substantial relative disadvantage.

Although an exemplary embodiment of the removable floor box of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An improved floor box for installation into a poured concrete floor for providing temporary connections to utilities, said improved floor box comprising:

a housing member having enclosed sides and an enclosed bottom, said housing member being open on the top side thereof;

a plurality of hollow guide members contained in said housing member, said guide members each being closed except for an opening located at said bottom of said housing member for receiving a support member therein;

a plurality of thin sheets of degradable material for surrounding said sides and said bottom of said housing member prior to it being encased in concrete;

a rim member for surrounding the sides of said housing member at said top side thereof and on the exterior thereof; said rim member being for recessed installation into the poured concrete floor; and a cover apparatus for removable installation into said rim member in recessed fashion such that the top surface of said cover apparatus is essentially flush with the level of the poured concrete floor.

2. An improved floor box as defined in claim 1, wherein said housing member has four sides, and wherein one of said hollow guide members is located at each corner of said housing member.

3. An improved floor box as defined in claim 2, wherein said guide members are located inside said housing member at each corner thereof, and wherein the open bottom end of each of said guide members communicates with an aperture located in and extending through said bottom of said housing member, said open bottom ends of said guide members being secured to said bottom of said housing member in sealing relationship around said apertures in said bottom of said housing member.

4. An improved floor box as defined in claim 1, wherein each of said guide members comprises:

a guide tube, said guide tube being sealed at the top end thereof and open at the bottom end thereof.

5. An improved floor box as defined in claim 1, wherein said housing member and said hollow tubes are made of PVC material.

6. An improved floor box as defined in claim 5, wherein said PVC material is white.

7. An improved floor box as defined in claim 1, wherein said housing member and said hollow tubes are molded in unitary fashion in a single assembly.

8. An improved floor box as defined in claim 1, additionally comprising:

a plurality of elongated support members having first and second ends, each support member for placement with said first end extending into one of said guide members and said second end extending from said bottom side of said housing member.

9. An improved floor box as defined in claim 8, wherein each of said support members comprises:

a threaded rod having a first end and a second end, said first end of said threaded rod for removable placement into one of said guide members;

a washer located on said threaded rod below said bottom of said housing member; and a nut located on said threaded rod below said washer in a position intermediate said first and second ends of said threaded rod, said nut supporting said washer which in turn supports said bottom of said housing member in part.

10. An improved floor box as defined in claim 1, additionally comprising:

a plurality of segments of string surrounding said thin sheets of degradable material around said sides and said bottom of said housing member to thereby maintain said thin sheets of degradable material in position around said sides and said bottom of said housing member.

11. An improved floor box as defined in claim 1, wherein said thin sheets of degradable material comprise:

thin sheets of extruded polystyrene expanded foam material.

12. An improved floor box as defined in claim 1, wherein said thin sheets of degradable material are each approximately 1/8 inch thick.

13. An improved floor box as defined in claim 1, wherein said rim member is shaped in cross section like a stretched "Z" with two right angle bends therein, wherein said rim member has an outer portion which is rectangular in configuration with rounded corners for receiving said cover apparatus therein, and wherein said rim member has an inner portion which is rectangular in configuration for receiving the sides of said housing member at said top side thereof and on the exterior thereof.

14. An improved floor box as defined in claim 13, additionally comprising:

a plurality of bolts for securing said housing member to said rim member, said bolts extending sequentially through said sides of said housing member and into said rim member.

15. An improved floor box as defined in claim 13, additionally comprising:

a pair of angle iron members mounted on the bottom of said rim member on opposite sides thereof, said angle iron members having apertures therein near the ends thereof for receiving re-bar segments therein to assist in retaining said rim member in place when concrete is poured thereabout.

16. An improved floor box as defined in claim 1, wherein said cover apparatus comprises:

a cover frame having at least one aperture located therein, said cover frame for removable installation into said rim member such that the top surface of said cover frame is essentially flush with the level of the poured concrete floor; and a cover for removable installation into said aperture located in said cover frame such that the top surface of said cover is essentially flush with the top surface of said cover frame.

17. An improved floor box as defined in claim 16, wherein said cover frame comprises:

a recessed ledge located in said aperture in said cover frame, said cover being supported on said recessed ledge.

18. An improved floor box as defined in claim 16, wherein said cover frame has two apertures located therein, each of said apertures for receiving covers therein, said cover frame additionally comprising:

a crossbar which extends between opposite sides of said cover frame and is located between said apertures in said cover frame to support very heavy loads.

19. An improved floor box as defined in claim 16, wherein said cover comprises:

a recess located in the top surface thereof; and a handle, said handle having a stored position in which said handle is mounted in said recess flush with the surface of said cover, said handle also having a deployed position in which said handle may be removed from said recess and used to lift said cover.

20. An improved floor box as defined in claim 16, wherein said cover comprises:

a notch located in an edge of said cover; and a door for installation in said notch in said edge of said cover, said door having a closed position in which said door is located in said notch to block access therethrough, said door also having an open position in which said door does not block access through said notch.

21. An improved floor box as defined in claim 20, additionally comprising:

a hinge for moveably installing said door in said notch in said cover, said hinge being a friction hinge tending to maintain the door in any position in which it is placed.

22. An improved floor box as defined in claim 1, additionally comprising:

sealing means providing a water resistant fit between said cover apparatus and said rim member.

23. An improved floor box as defined in claim 1, additionally comprising:

means for connecting an electrical conduit disposed within the poured concrete floor to said housing member, said connecting means being adapted to be removable from the interior of said housing member to allow said electrical conduit to be disconnected from said housing member, thereby allowing said housing member to be removed from said electrical conduit to facilitate said housing member being removed from its location in the poured concrete floor.

24. An improved floor box as defined in claim 23, wherein said connecting means comprises:

a coupling member attached to said electrical conduit, said coupling member having threads located inside a free end thereof, said free end of said coupling member abutting one of said sides or said bottom of said housing member; and a chase nipple having threads located on the outside of an end thereof, said threaded end of said chase nipple for insertion through an aperture located in said one of said sides or said bottom of said housing member abutted by said coupling member from the interior thereof, said threaded end of said chase nipple then being screwed into said threaded interior of said free end of said coupling member.

25. An improved floor box as defined in claim 1, additionally comprising:

means for connecting a water or air supply pipe disposed within the poured concrete floor to said housing member, said connecting means being adapted to be removable from the interior of said housing member to allow said water or air supply pipe to be disconnected from said housing member, thereby allowing said housing member to be removed from said water or air supply pipe to facilitate said housing member being removed from its location in the poured concrete floor.

26. An improved floor box as defined in claim 25, wherein said connecting means comprises:

a socket elbow attached to said water or air supply pipe, said coupling member having threads located inside a free end thereof, said free end of said coupling elbow abutting said bottom of said housing member;

a threaded nipple screwed into the threaded interior of said free end of said coupling elbow, said threaded nipple extending through an aperture located in said bottom of said housing member;

a washer and a nut each located on said threaded nipple inside said housing member; and a valve body mounted on the end of said threaded nipple located inside said housing member.

27. An improved floor box as defined in claim 1, additionally comprising:

means for connecting a drain pipe disposed within the poured concrete floor to said housing member, said connecting means being adapted to be removable from the interior of said housing member to allow said drain pipe to be disconnected from said housing member, thereby allowing said housing member to be removed from said drain pipe to facilitate said housing member being removed from its location in the poured concrete floor.

28. An improved floor box as defined in claim 27, wherein said connecting means comprises:

an aperture located in said bottom of said housing member;

a segment of pipe located outside said housing member, said segment of pipe being sealed to said bottom of said housing member around said aperture in said bottom of said housing member; and a coupling member connected to said drain pipe, said coupling member for receiving the free end of said segment of pipe therein.

29. An improved floor box as defined in claim 28, additionally comprising:

a circular recess located in said bottom of said housing member on the inside thereof around said aperture located in said bottom of said housing member; and a domed strainer mounted in said circular recess.

30. An improved floor box for installation into a poured concrete floor for providing temporary connections to utilities, said improved floor box comprising:

a housing member having four enclosed sides and an enclosed bottom, said housing member being open on the top side thereof;

four hollow guide members contained in said housing member at the corners thereof on the inside thereof, said guide members each being closed except for an opening located at said bottom of said housing member for receiving a support member therein;

a plurality of thin sheets of degradable material for surrounding said sides and said bottom of said housing member prior to it being encased in concrete;

a rim member for surrounding the sides of said housing member at said top side thereof and on the exterior thereof; said rim member being for recessed installation into the poured concrete floor;

means for connecting an electrical conduit, a water or air supply pipe, and a drain pipe all disposed within the poured concrete floor to said housing member, said connecting means being adapted to be removable from the interior of said housing member to allow said electrical conduit, said water or air supply pipe, and said drain pipe to each be disconnected from said housing member, thereby allowing said housing member to be removed from said electrical conduit, said water or air supply pipe, and said drain pipe to facilitate said housing member being removed from its location in the poured concrete floor;

a cover frame having two apertures located therein, said cover frame for removable installation into said rim member such that the top surface of said cover frame is essentially flush with the level of the poured concrete floor; and two covers for removable installation into said aperture located in said cover frame such that the top surfaces of said covers are essentially flush with the top surface of said cover frame.

31. An improved floor box for installation into a poured concrete floor for providing temporary connections to utilities, said improved floor box comprising:

a housing member having enclosed sides and an enclosed bottom, said housing member being open on the top side thereof;

a plurality of hollow guide members contained in said housing member, said guide members each being closed except for an opening located at said bottom of said housing member for receiving a support member therein;

a rim member for surrounding the sides of said housing member at said top side thereof and on the exterior thereof, said rim member being for recessed installation into the poured concrete floor; and a cover apparatus for removable installation into said rim member in recessed fashion such that the top surface of said cover apparatus is essentially flush with the level of the poured concrete floor.

32. A method of installing an improved floor box into a poured concrete floor for providing temporary connections to utilities, said method comprising:

placing a plurality of support members in position to support a housing member having enclosed sides and an enclosed bottom, said housing member being open on the to side thereof, said housing member containing a plurality of hollow guide members, said guide members each being closed except for an opening located at said bottom of said housing member for receiving one of said support members therein;

surrounding said sides and said bottom of said housing member with a plurality of thin sheets of degradable material prior to said housing member being encased in concrete or the like;

surround the sides of said housing member with a rim member at said top side thereof and on the exterior thereof, said rim member being for recessed installation into the poured concrete floor;

pouring said concrete floor; and removably installing A cover apparatus into said rim member in recessed fashion such that the top surface of said cover apparatus is essentially flush with the level of the poured concrete floor.

33. An improved floor box for installation into a poured concrete floor for providing temporary connections to utilities, said improved floor box comprising:

a housing member having enclosed sides and an enclosed bottom, said housing member being open on the top side thereof;

a plurality of thin sheets of degradable material for surrounding said sides and said bottom of said housing member prior to it being encased in concrete; and a cover apparatus for removable installation above said housing member.

\* \* \* \* \*